United States Patent
Yang et al.

(10) Patent No.: US 7,608,960 B2
(45) Date of Patent: Oct. 27, 2009

(54) MOUNTING STRUCTURE FOR A STATOR OF A MOTOR- STATOR

(75) Inventors: Zhi-Ya Yang, Shenzhen (CN); Ying-Sen Chen, Taipei Hsien (TW); Wen-Gao Wang, Shenzhen (CN); Shu-Ho Lin, Taipei Hsien (TW)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 197 days.

(21) Appl. No.: 11/742,724

(22) Filed: May 1, 2007

(65) Prior Publication Data

US 2008/0252163 A1   Oct. 16, 2008

(30) Foreign Application Priority Data

Apr. 11, 2007   (CN) .......................... 2007 1 0073885

(51) Int. Cl.
   *H02K 5/00*   (2006.01)
(52) U.S. Cl. ...................... 310/91; 310/67 R
(58) Field of Classification Search ................... 310/91, 310/67 R, 90
   See application file for complete search history.

(56) References Cited

U.S. PATENT DOCUMENTS

| | | | | |
|---|---|---|---|---|
| 5,363,003 A | * | 11/1994 | Harada et al. | 310/67 R |
| 6,462,443 B2 | * | 10/2002 | Horng | 310/68 B |
| 6,617,736 B1 | * | 9/2003 | Horng et al. | 310/91 |
| 6,882,074 B2 | | 4/2005 | Horng et al. | |
| 7,015,610 B2 | | 3/2006 | Horng et al. | |
| 7,485,995 B2 | * | 2/2009 | Ku et al. | 310/91 |
| 2008/0157633 A1 | * | 7/2008 | Yang et al. | 310/67 R |

* cited by examiner

*Primary Examiner*—Nguyen N Hanh
(74) *Attorney, Agent, or Firm*—Frank R. Niranjan

(57) ABSTRACT

A mounting structure for a motor includes a central tube (16), a supporting plate (13) and a motor-stator (30). The central tube includes two positioning blocks (162). The supporting plate includes a mounting block (18). The motor-stator includes a printed circuit board (31) and a stator (33). The stator defines an axis hole (337) for receiving a portion of the tube therein and two positioning grooves (3332) in an inner surface thereof. The printed circuit board defines a cutout (311) therein. One of the stator and the tube is rotated from an unlocked position, where the positioning blocks are located just above the positioning grooves and the mounting block is received in the cutout, to a locked position, where a bottom surface of the positioning blocks abut against a top surface of the stator and the mounting block leaves the cutout and engages with the printed circuit board.

20 Claims, 9 Drawing Sheets

US 7,608,960 B2

MOUNTING STRUCTURE FOR A STATOR OF A MOTOR- STATOR

BACKGROUND OF THE INVENTION

1. Field of the Invention

The present invention relates generally to a mounting structure, and more particularly to a mounting structure for a stator of a motor-stator.

2. Description of Related Art

An electrical fan usually includes a frame, a bearing support formed at a middle of the frame, a stator disposed around the bearing support, and a rotor rotatably mounted surrounding the stator. The bearing support is for receiving a bearing therein. The bearing rotatably supports a rotor shaft which is connected to the rotor. The bearing support is usually made of plastic, and includes a central tube for fixedly positioning the stator.

In order to fixedly positioning the stator in the central tube, adhesive is often spread between an outer surface of the central tube and an inner surface of the stator so that the stator is fixed to the central tube. This complicates the assembly of the electrical fan and thus increases the cost of the electrical fan. Furthermore, the adhesive is made of non-biodegradable material which may cause pollution.

SUMMARY OF THE INVENTION

The present invention relates to a mounting structure for a stator of a motor. According to a preferred embodiment of the present invention, the mounting structure includes a central tube, a supporting plate and a motor-stator. The central tube includes at least a positioning block. The supporting plate includes a mounting block. The motor-stator includes a printed circuit board and a stator. The stator defines an axis hole for receiving a portion of the tube therein and at least a positioning groove in an inner surface thereof. The printed circuit board defines a cutout therein. One of the stator and the tube is rotated from an unlocked position, where the positioning block is located just above the positioning groove and the mounting block is received in the cutout, to a locked position, where a bottom surface of the positioning block abuts against a top surface of the stator and the mounting block leaves the cutout and engages with the printed circuit board.

Other advantages and novel features of the present invention will become more apparent from the following detailed description of preferred embodiment when taken in conjunction with the accompanying drawings, in which:

DETAILED DESCRIPTION OF THE INVENTION

Figure 1:
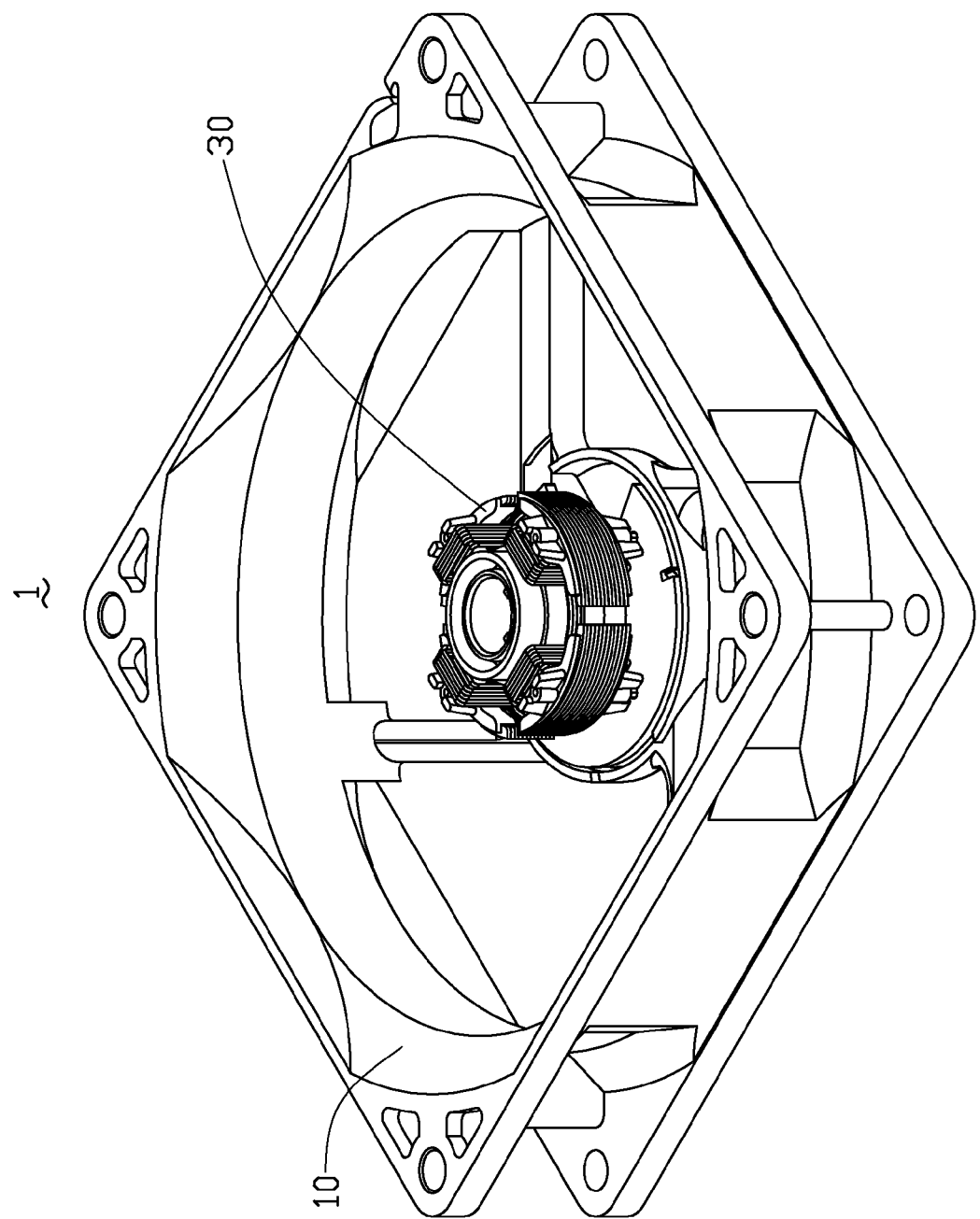
FIG. 1 is an isometric view of a fan motor containing a mounting structure according to a first embodiment of the present invention.

A mounting structure according to the present invention can be used in kinds of motors such as hard disk drive motors, or fan motors. Referring to FIG. 1, a fan motor 1 containing the mounting structure is shown. The fan motor 1 includes a frame 10, a motor-stator 30 mounted to the frame 10 and a rotor (not shown) to be rotatably disposed around the motor-stator 30. The mounting structure is used for mounting the motor-stator 30 onto a central tube 16 of the frame 10 of the fan motor 1. The central tube 16 is integrally formed with the frame 10 of the fan motor 1 from a single piece.

Figure 3:
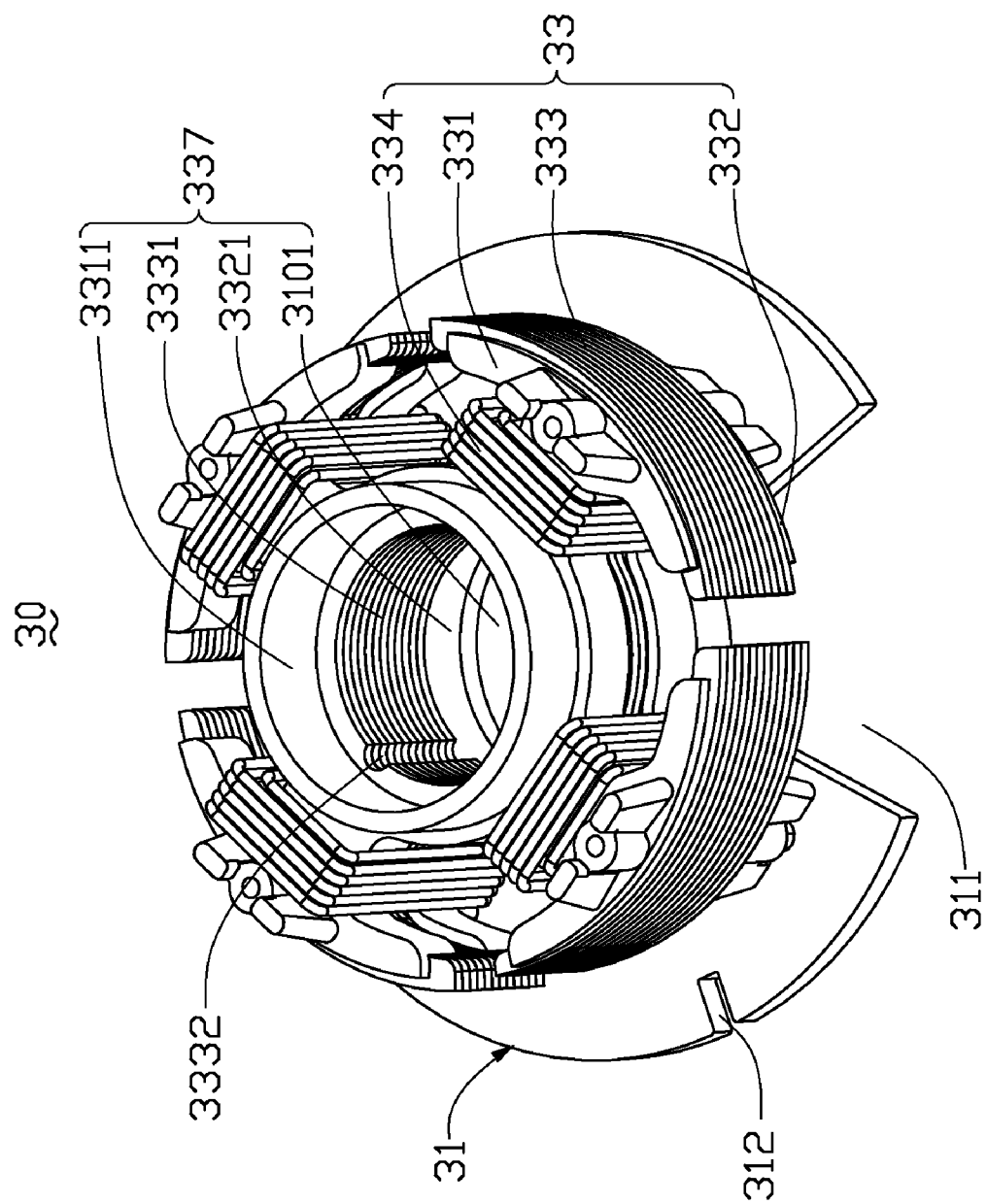
FIG. 3 is an isometric view of a motor-stator of the mounting structure of the fan motor.

Referring to FIG. 3, the motor-stator 30 includes a printed circuit board 31 and a stator 33 electrically connected with the printed circuit board 31. The printed circuit board 31 is annular shaped in profile and defines a central hole 3101 therein. The printed circuit board 31 defines a V-shaped cutout 311 at one side thereof. The cutout 311 communicates with the central hole 3101 of the printed circuit board 31 and extends through an edge of the printed circuit board 31. The printed circuit board 31 further defines a mounting groove 312 through the edge and is separated by a distance from the cutout 311 of the printed circuit board 31.

The stator 33 is fixed to the printed circuit board 31 and includes a top insulator 331, a bottom insulator 332, a yoke assembly 333 sandwiched between the top and bottom insulators 331, 332 and a coil 334 disposed around teeth (not labeled) of the yoke assembly 333. The coil 334 electrically connects with the printed circuit board 31. The top and bottom insulators 331, 332 and the yoke assembly 333 respectively define central holes 3311, 3321, 3331 therein. The central holes 3311, 3321, 3331 of the top and bottom insulators 331, 332 and the yoke assembly 333 are coaxial with the central hole 3101 of the printed circuit board 31 so as to cooperatively form an axis hole 337 for the motor-stator 30. A diameter of the central hole 3331 of the yoke assembly 333 is less than that of the central holes 3311, 3321, 3101 of the top and bottom insulators 331, 332 and the printed circuit board 31. An inner surface of the yoke assembly 333 extends inwardly beyond inner surfaces of the top and bottom insulators 331, 332. The inner surface of the yoke assembly 333 defines two symmetrical positioning grooves 3332 therein. The positioning grooves 3332 are semi-column shaped in profile.

Figure 2:
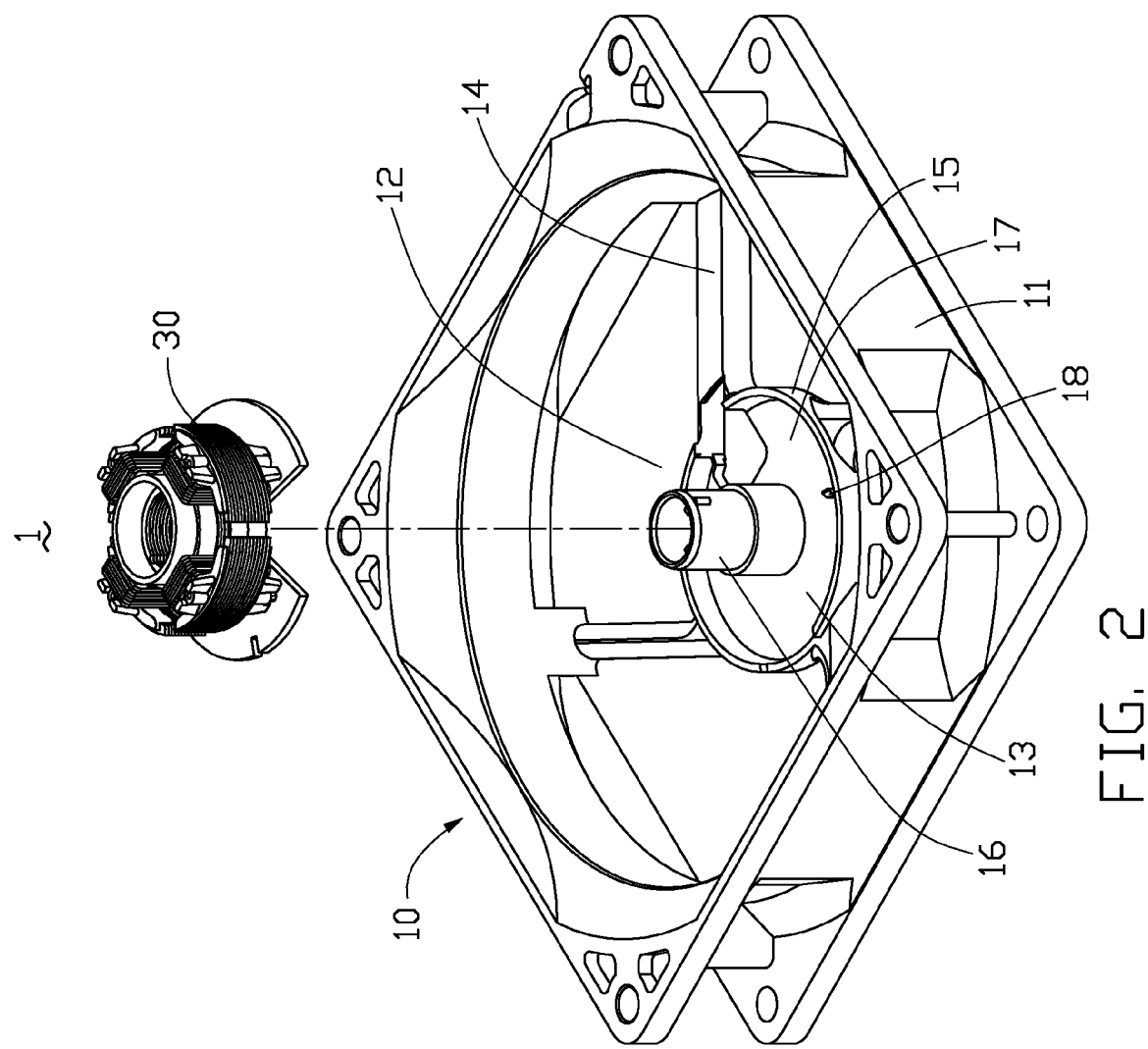
FIG. 2 is an exploded, isometric view of the fan motor of FIG. 1.
Figure 4:
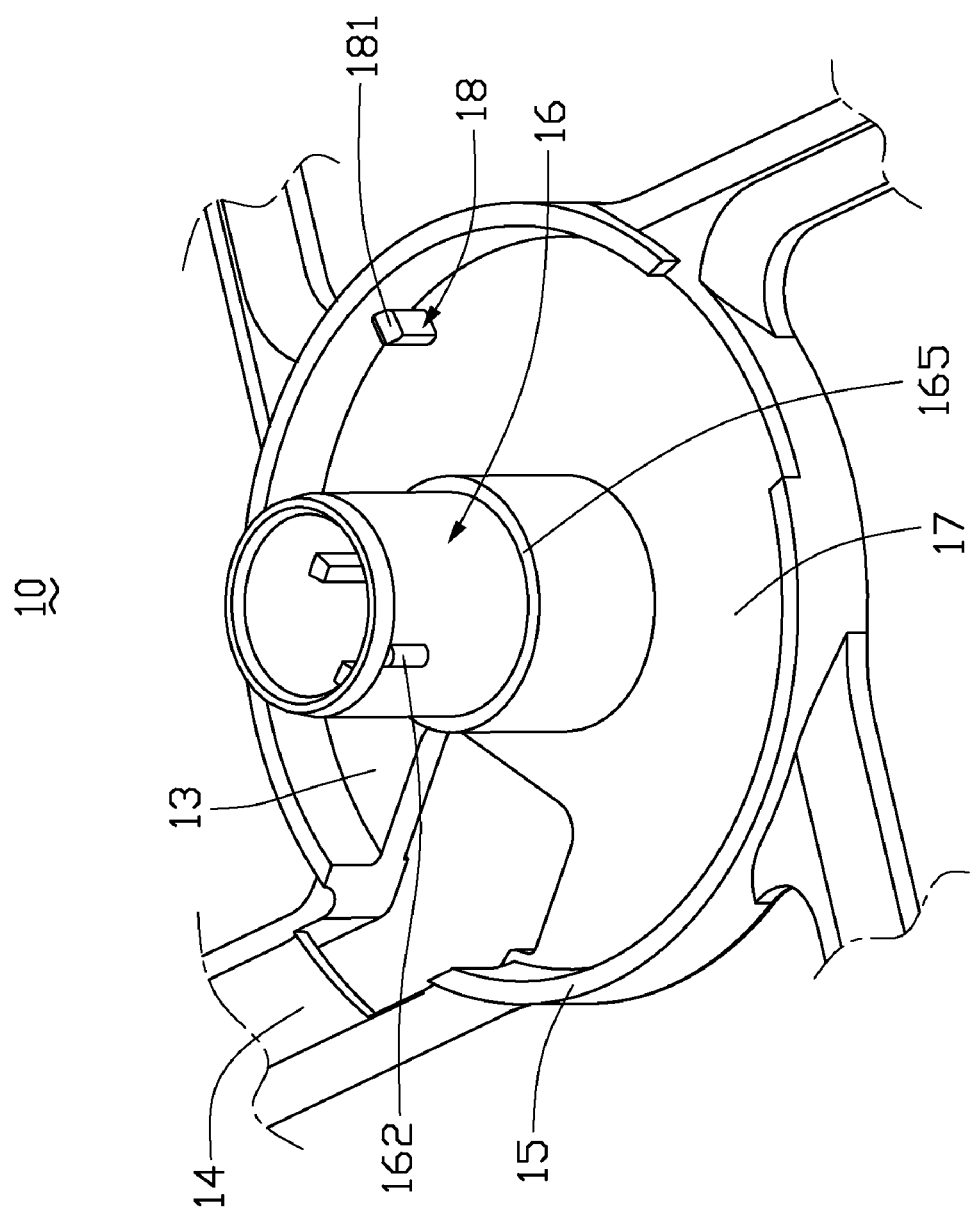
FIG. 4 is a partly enlarged view of a central tube of the mounting structure of the fan motor.

Referring to FIGS. 2 and 4, the frame 10 of the fan motor 1 includes a rectangular shaped main body 11. The main body 11 of the frame 10 defines an accommodating space 12 for receiving the motor-stator 30 and the rotor therein. The frame 10 of the fan motor 1 further includes a circular supporting plate 13 at a bottom of the main body 11, and a plurality of ribs 14 integrally connecting the supporting plate 13 with the bottom of the main body 11. The central tube 16 is integrally formed with the supporting plate 13 and the frame 10 to form a single piece and extends upwardly from a middle portion of the supporting plate 13 into the accommodating space 12.

The supporting plate 13 has an annular flange 15 which extends from a periphery thereof. An annular recess 17 is therefore defined between the flange 15, a top surface of the supporting plate 13 and an outer wall of a bottom of the central tube 16. A mounting block 18 axially and upwardly extends from the supporting plate 13 from a position adjacent to the flange 15. The mounting block 18 is made of resilient materials selected from plastics and rubber and integrally injected with the supporting plate 13 to form a single piece. Alternatively, the mounting block 18 may be separately formed from the supporting plate 13. The mounting block 18 has a slantwise planar guiding surface 181 at a top thereof. A height of the mounting block 18 gradually increases along a circumferential direction of the supporting plate 13, as viewed counterclockwise from FIG. 4. Alternatively, the guiding surface 181 of the mounting block 18 may be configured to be arc shaped with an apex at a middle thereof.

The central tube 16 is a hollow cylinder. A diameter of the outer wall of the central tube 16 is slightly less than a diameter of the central hole 3331 of the yoke assembly 333. The central tube 16 extends through the central holes 3101, 3321, 3331, 3311 of the printed circuit board 31, of the bottom insulator 332, of the yoke assembly 333, and of the top insulator 331 in that order. The central tube 16 integrally and radially extends two positioning blocks 162 from a top end thereof. The positioning blocks 162 are symmetrically disposed on the outer wall of the central tube 16 and have semicircular shaped cross sections so as to match the positioning grooves 3332 of the yoke assembly 333. Alternatively, the positioning block 162 may be rectangular shaped, or prism-shaped in profile, and the positioning groove 3332 may have a similar configuration to the positioning block 162 so that the positioning block 162 can extend through the positioning groove 3332 of the yoke assembly 333. The central tube 16 integrally and axially extends an annular protrusion 165 from the outer wall of the central tube 16 at a bottom end thereof. A distance between a top surface of the protrusion 165 and a bottom surface of the positioning block 162 is substantially equal to a height of the yoke assembly 333 so that the yoke assembly 333 can be interferentially sandwiched between the protrusion 165 and the positioning blocks 162.

Figure 5:
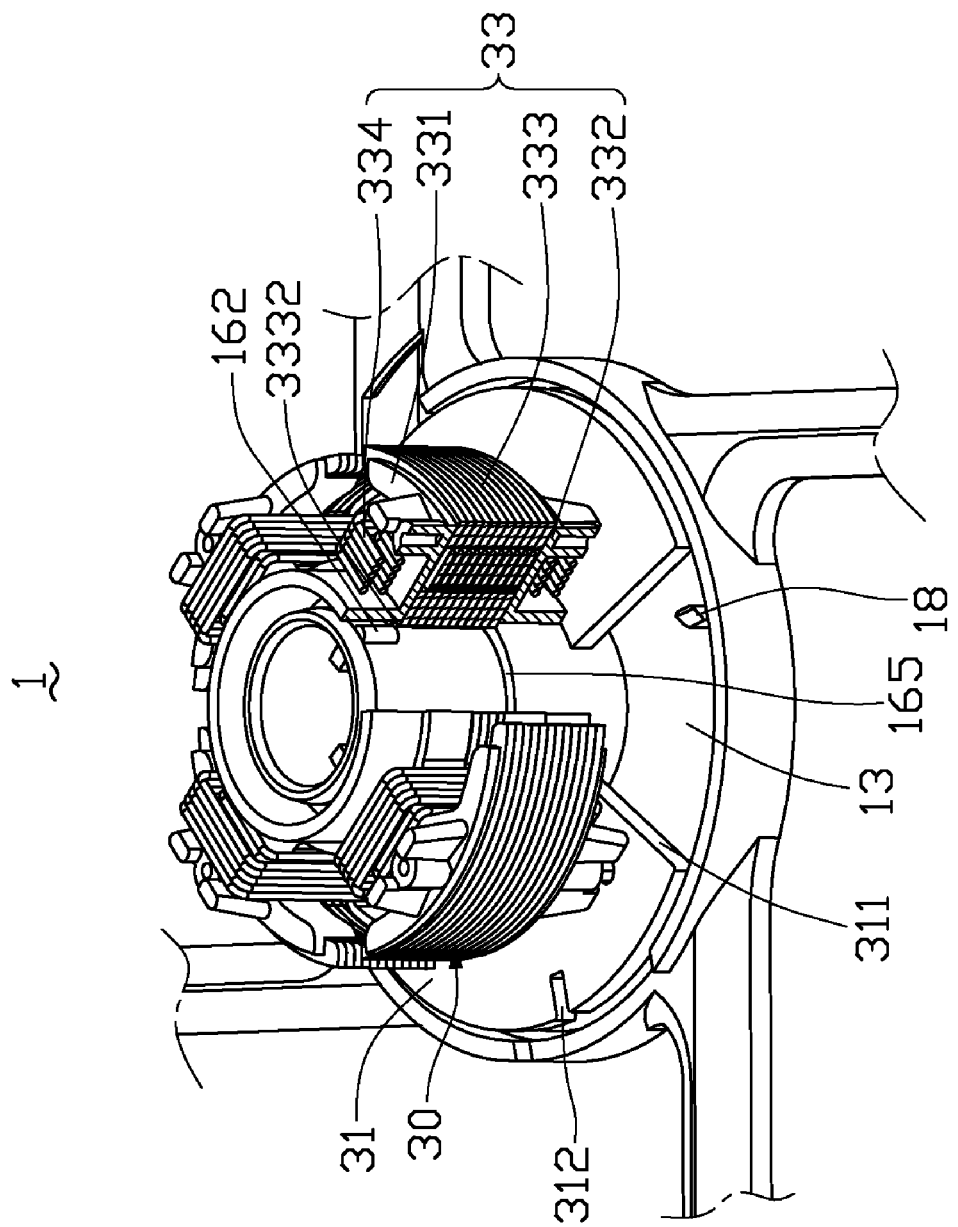
FIGS. 5 and 6 are assembled views of the fan motor of FIG. 1, respectively at unlock and locked positions and with different parts being cut away for clarity.
Figure 6:
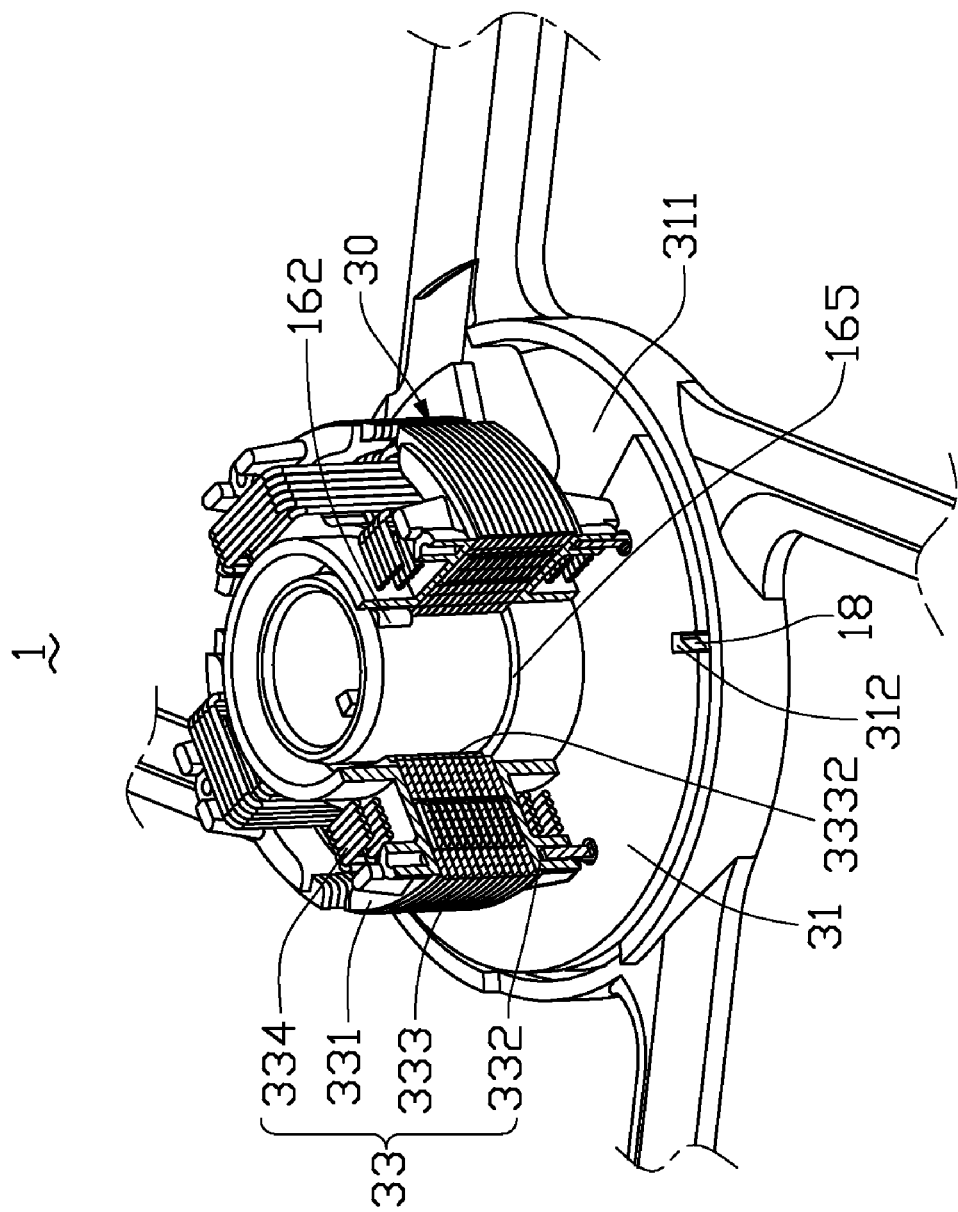

Referring to FIG. 5, in assembly of the fan motor 1, the motor-stator 30 is loosely disposed around the central tube 16 of the frame 10, with a part of the central tube 16 extending through the axis hole 337 of the motor-stator 30. Meanwhile, parts of the positioning blocks 162 of the central tube 16 extend through the positioning grooves 3332 of the yoke assembly 333, and the mounting block 18 of the supporting plate 13 is received in the cutout 311 of the printed circuit board 31. The motor-stator 30 is pressed downwardly until the printed circuit board 31 is received in the recess 17 and is separated by a distance from the top surface of the supporting plate 13. Meanwhile, the whole of the central tube 16 extends through the axis hole 337 of the motor-stator 30. A bottom surface of the yoke assembly 333 abuts against the top surface of the protrusion 165, and the bottom surfaces of the positioning blocks 162 are coplanar with a top surface of the yoke assembly 333. Referring to FIG. 6, the motor-stator 30 is rotated from this position (unlocked position) along the height increasing direction of the mounting block 18 of the supporting plate 13 (i.e., counterclockwise as viewed from a top of FIG. 6) towards a locked position, where the mounting block 18 of the supporting plate 13 leaves the cutout 311 and is received in the mounting groove 312 of the printed circuit board 31, to thereby circumferentially and radially securely mount the motor-stator 30 to the central tube 16. In the locked position, the positioning blocks 162 of the central tube 16 leave the corresponding positioning grooves 3332 of the yoke assembly 333 and abut against the top surface of the yoke assembly 333 to thereby axially securely positioning the motor-stator 30 to the central tube 16.

In the assembly of the present mounting structure, the positioning blocks 162 of the central tube 16 abut against the top surface of the yoke assembly 333. Simultaneously, the mounting block 18 of the supporting plate 13 is received in the mounting groove 311 of the printed circuit board 31, and the inner surface of the yoke assembly 333 interferentially engages with the outer wall of the central tube 16. Therefore, the motor-stator 30 is axially, radially and circumferentially securely mounted to the central tube 16. There is no need to spread the adhesive between the outer wall of the central tube 16 and the inner surface of the yoke assembly 333, which decreases the cost of the fan motor 1 and satisfies the need to protect the environment. Moreover, the motor-stator 30 is assembled to the central tube 16 merely via pressing and rotation operations of the motor-stator 30, which simplifies the assembly of the mounting structure and further decreases the cost of the fan motor 1. Furthermore, the fan motor 1 can easily be disassembled after the assembly thereof. Therefore, components such as the motor-stator 30, or the frame 10 of the fan motor 1 can easily be changed, or repaired, which decreases the cost of the fan motor 1 further.

In the present mounting structure, the mounting groove 312 of the printed circuit board 31 can be omitted. This makes the mounting block 18 of the supporting plate 13 abut against the bottom surface of the printed circuit board 31 at the locked position.

Figure 7:
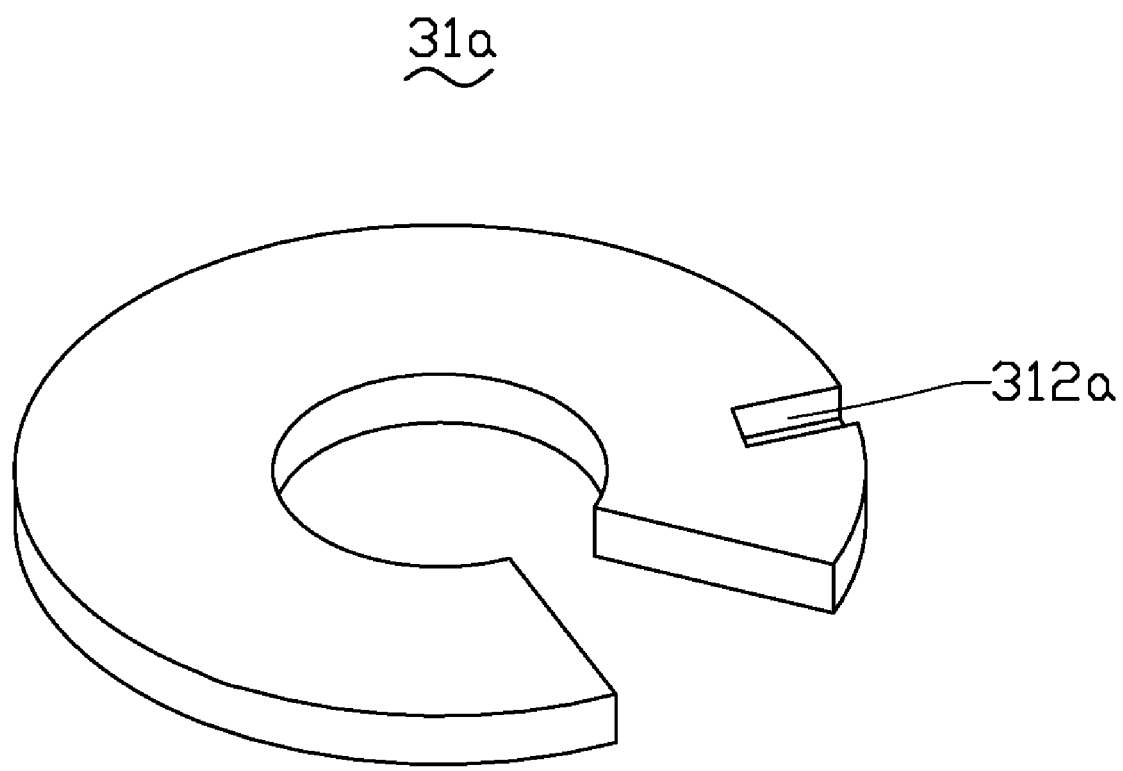
FIG. 7 is an isometric view of a printed circuit board of a motor-stator of a mounting structure according to a second embodiment of the present invention.
Figure 8:
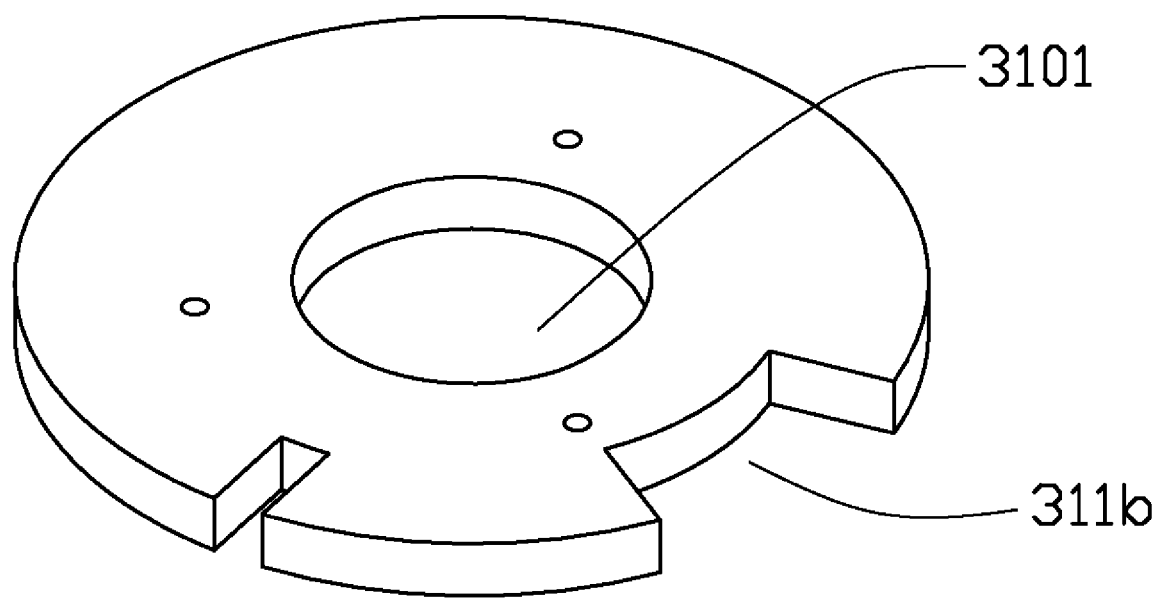
FIG. 8 is an isometric view of a printed circuit board of a motor-stator of a mounting structure according to a third embodiment of the present invention.
Figure 9:
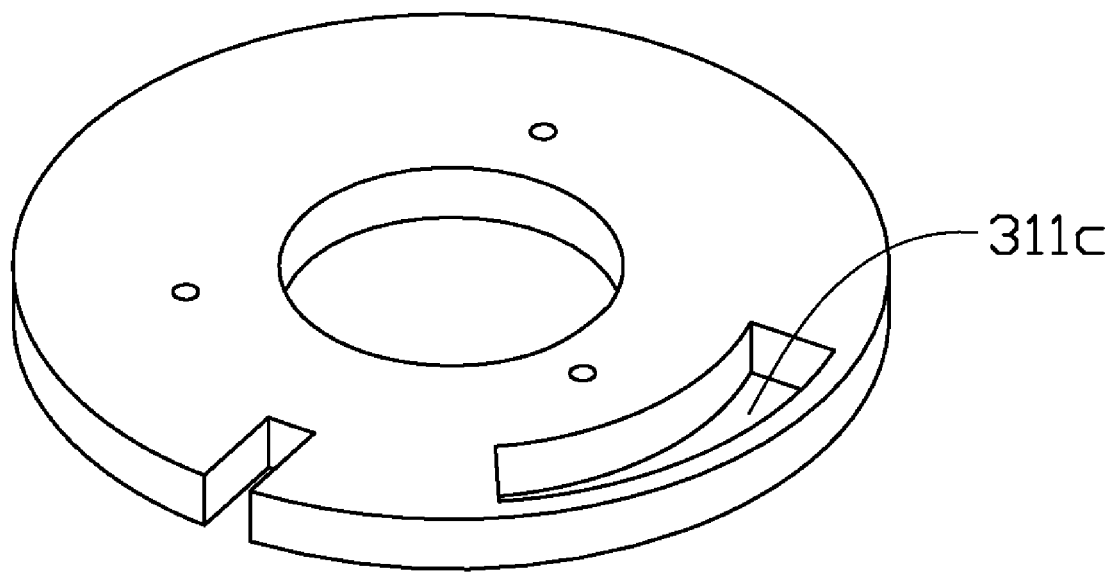
FIG. 9 is an isometric view of a printed circuit board of a motor-stator of a mounting structure according to a fourth embodiment of the present invention.

Referring to FIG. 7, a printed circuit board 31a according to a second embodiment of the present invention is shown. Contrary to the first embodiment, the mounting groove 312a is defined at a bottom portion of the printed circuit board 31a but does not extend through the printed circuit board 31a. Referring to FIG. 8, the cutout 311b is defined at an edge of the central hole 3101 but does not communicate with the central hole 3101 of the printed circuit board 31b. Referring to FIG. 9, the cutout 311c has an arc-shaped configuration and does not extend though the printed circuit board 31c. The cutout 311c is defined in an inner portion of and is separated by a distance from an edge of the printed circuit board 31c.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting structure for a motor comprising:
   a central tube comprising at least a positioning block;
   a supporting plate connected with the central tube and comprising a mounting block, wherein the central tube extends upwardly from the supporting plate; and
   a motor-stator comprising a printed circuit board and a stator electrically connected with the printed circuit board, the stator defining an axis hole for receiving a portion of the tube therein and at least a positioning groove in an inner surface thereof, the printed circuit board defining a cutout therein;
   wherein one of the stator and the tube is rotated from an unlocked position, where the at least a positioning block is located just above the at least a positioning groove and the mounting block is received in the cutout, to a locked position, where a bottom surface of the at least a positioning block abuts against a top surface of the stator and the mounting block leaves the cutout and engages in the printed circuit board.

2. The mounting structure as described in claim 1, wherein the printed circuit board defines a mounting groove therein, the mounting block being received in the mounting groove at the locked position.

3. The mounting structure as described in claim 1, wherein the mounting block is made of resilient materials selected from plastics and rubber.

4. The mounting structure as described in claim 1, wherein the mounting block has a guiding surface at a top thereof, a height of mounting block gradually increasing along a circumferential direction of the supporting plate.

5. The mounting structure as described in claim 4, wherein the guiding surface is a slantwise planar surface.

6. The mounting structure as described in claim 4, wherein the guiding surface is an arc-shaped surface.

7. The mounting structure as described in claim 1, wherein the cutout is V-shaped in profile and communicates with the axis hole of the stator.

8. The mounting structure as described in claim 1, wherein the cutout is arc-shaped in profile and isolates from the axis hole of the stator.

9. The mounting structure as described in claim 1, wherein the central tube, the at least a positioning block, the mounting block and the supporting plate are integrally formed from a single piece.

10. A fan motor comprising:
a frame comprising a supporting plate and a central tube on the supporting plate, the central tube comprising at least a radial positioning block and the supporting plate comprising an axial mounting block; and
a motor-stator comprising a printed circuit board and a stator electrically connected with the printed circuit board, the stator defining an axis hole and at least a positioning groove therein, and the printed circuit board defining a mounting groove therein, the central tube and the at least a radial positioning block respectively extending through the axis hole and the at least a positioning groove of the stator so the at least a radial positioning block is located just above the at least a positioning groove and then the at least a radial positioning groove being rotated with respect to the central tube to make a bottom surface of the at least a radial positioning block abut against a top surface of the stator, whilst the mounting groove being rotated with respect to the mounting block to make the mounting block be received in the mounting groove.

11. The fan motor as described in claim 10, wherein the printed circuit board defines a cutout receiving the mounting block therein before the rotation of the mounting groove.

12. The fan motor as described in claim 10, wherein the mounting block is made of resilient materials selected from plastics and rubber.

13. The fan motor as described in claim 10, wherein the mounting block has a guiding surface at a top thereof, a height of mounting block gradually increasing along a circumferential direction of the supporting plate.

14. The fan motor as described in claim 10, wherein the central tube, the at least a radial positioning block, the mounting block and the supporting plate are integrally formed from a single piece.

15. An electric fan comprising:
a frame having a central supporting plate and a central tube extending upwardly from a center of the central support plate, the supporting plate having a mounting block formed on a top surface thereof and the central tube having at least a positioning block formed at a circumferential periphery thereof; and
a motor-stator surrounding the central tube and having a printed circuit board and a stator mounted on the printed circuit board and electrically connected therewith, wherein the stator has at least an axially extended groove in an inner face thereof and the printed circuit has a cutout, and wherein at an unlocked position of the motor-stator, the at least a positioning block is positioned just above the at least an axially extended groove of the stator and the mounting block is received in the cutout of the printed circuit board, and at a locked position of the motor-stator, the at least a positioning block is positioned abutting against a top surface of the stator and the mounting block engages with the printed circuit board, the motor-stator being moved from the unlocked position to the locked position by rotating the motor-stator about the central tube.

16. The electric fan as described in claim 15, wherein the printed circuit board has a mounting groove in an edge thereof and spaced from the cutout, and the mounting block engages in the mounting groove when the motor-stator is at the locked position.

17. The electric fan as described in claim 16, wherein the mounting block has a top end defining a slanted guiding surface for facilitating the engagement between the mounting block and the printed circuit board.

18. The electric fan as described in claim 16, wherein the mounting block has an arc-shaped top end for facilitating the engagement between the mounting block and the printed circuit board.

19. The electric fan as described in claim 15, wherein the at least a positioning block is formed on a top end of the circumferential periphery of the central tube.

20. The electric fan as described in claim 15, wherein the cutout is communicated with a central hole of the printed circuit board.

* * * * *